United States Patent
Adibhatla et al.

(10) Patent No.: US 9,758,252 B2
(45) Date of Patent: Sep. 12, 2017

(54) METHOD, SYSTEM, AND APPARATUS FOR REDUCING A TURBINE CLEARANCE

(71) Applicant: General Electric Company, Schenectady, NY (US)

(72) Inventors: Sridhar Adibhatla, Glendale, OH (US); Steven Edward Nolte, Harrison, OH (US); Gerhard Walter Moeller, Goshen, OH (US); Christopher Timothy Gallagher, Ft. Thomas, KY (US); John William Hanify, Hamilton, OH (US); Grant Alan Ingram, West Chester, OH (US)

(73) Assignee: General Electric Company, Schenectady, NY (US)

( * ) Notice: Subject to any disclaimer, the term of this patent is extended or adjusted under 35 U.S.C. 154(b) by 27 days.

(21) Appl. No.: 15/077,731

(22) Filed: Mar. 22, 2016

(65) Prior Publication Data

US 2016/0311546 A1    Oct. 27, 2016

Related U.S. Application Data

(63) Continuation-in-part of application No. 13/954,541, filed on Jul. 30, 2013, now abandoned.

(Continued)

(51) Int. Cl.
*B64D 31/06* (2006.01)
*F01D 11/24* (2006.01)

(52) U.S. Cl.
CPC .............. *B64D 31/06* (2013.01); *F01D 11/24* (2013.01)

(58) Field of Classification Search
CPC .......... B64D 31/06; F01D 11/20; F01D 11/24
See application file for complete search history.

(56) References Cited

U.S. PATENT DOCUMENTS 3,085,398 A    4/1963   Ingleson
4,999,991 A *  3/1991   Haddad ................... F01D 11/24
                                                              415/178

(Continued)

FOREIGN PATENT DOCUMENTS

GB      2233399 A      1/1991
WO      2011053805 A1  5/2011

OTHER PUBLICATIONS

Search Report from corresponding GB application No. 1315359.8 dated Mar. 18, 2014.

(Continued)

*Primary Examiner* — Jerrah Edwards
*Assistant Examiner* — Kelly D Williams
(74) *Attorney, Agent, or Firm* — General Electric Company; Pamela A. Kachur (57) ABSTRACT

A method for reducing a turbine clearance gap between a plurality of rotor blades of a turbine engine and a shroud of the turbine engine is provided. The method includes determining that an airplane is in a first flight condition, and adjusting the turbine clearance gap to a first clearance gap distance associated with the first flight condition. The method also includes determining a demand for a second flight condition, and adjusting an engine responsiveness to a first engine responsiveness for a first predetermined change in a power parameter of the engine. The method further includes reducing the engine responsiveness from the first engine responsiveness level to a second engine responsiveness level for a second predetermined change in the power parameter of the engine, and closing a clearance control valve associated with the shroud during the second predetermined change in the power parameter of the engine.

14 Claims, 8 Drawing Sheets

Related U.S. Application Data (60) Provisional application No. 61/692,523, filed on Aug. 23, 2012.

(56) References Cited

U.S. PATENT DOCUMENTS

| | | | |
|---|---|---|---|
| 5,012,420 A * | 4/1991 | Walker | F01D 11/24 |
| | | | 415/1 |
| 5,090,193 A * | 2/1992 | Schwarz | F01D 11/24 |
| | | | 60/782 |
| 6,353,734 B1 | 3/2002 | Wright et al. | |
| 7,438,259 B1 | 10/2008 | Piasecki et al. | |
| 7,774,106 B2 | 8/2010 | Calandra et al. | |
| 7,949,440 B2 | 5/2011 | Ramos et al. | |
| 2001/0044680 A1 | 11/2001 | Lemelson et al. | |
| 2007/0050101 A1 | 3/2007 | Sacle et al. | |
| 2008/0039076 A1 | 2/2008 | Ziarno et al. | |
| 2009/0026504 A1 | 1/2009 | Okuda et al. | |
| 2009/0319150 A1 * | 12/2009 | Plunkett | F01D 11/20 |
| | | | 701/100 |
| 2009/0326745 A1 | 12/2009 | Ramos et al. | |
| 2010/0324758 A1 | 12/2010 | Piasecki et al. | |
| 2011/0046818 A1 | 2/2011 | Herkes et al. | |
| 2013/0054055 A1 | 2/2013 | Mathews, Jr. et al. | |

OTHER PUBLICATIONS

Tucker, Tom "Harnessing the Brute: The Development of Propulsion Controlled Aircraft at NASA Dryden," NASA 19990021055, Oct. 1998.

Charles L. Hall et al., "F/A-18E/F F414 Advanced Inflight Engine Condition Monitoring System (IECMS)", Aerospace Conference, 2001, IEEE Proceedings, vol. 6, Mar. 2001, pp. 3069-3082.

Search Report from General Electric Company, search conducted Aug. 5, 2011.

* cited by examiner

METHOD, SYSTEM, AND APPARATUS FOR REDUCING A TURBINE CLEARANCE

CROSS REFERENCE TO RELATED APPLICATIONS

This application is a continuation-in-part of U.S. patent application Ser. No. 13/954,541, filed Jul. 30, 2013, which claims the benefit of priority to U.S. Provisional Patent Application No. 61/692,523, filed Aug. 23, 2012, the entire contents of which are hereby incorporated by reference in their entireties.

BACKGROUND

The subject matter disclosed herein relates generally to aircraft engines and, more specifically, to controlling a turbine clearance within an aircraft engine to facilitate more efficient operation of the aircraft engine during operations.

At least some known aircraft include an engine control system, sometimes referred to as a full authority digital engine control (FADEC). The FADEC is a system that includes a digital computer and its related accessories that control all aspects of aircraft engine performance. The FADEC receives multiple current input variables of the current flight condition including, for example, but not limited to, air density, throttle lever position, engine temperatures, engine pressures, and current values of other engine parameters. The inputs are received and analyzed many times per second. Engine operating parameters such as fuel flow, stator vane position, bleed valve position, and others are computed from this data and applied as appropriate to provide optimum engine efficiency for a given current flight condition.

The aircraft also typically include a flight control system, which may include a system typically referred to as a flight management system (FMS). The FMS is a specialized computer system that automates a wide variety of in-flight tasks, including the in-flight management of the flight plan. Using various sensors, such as, but not limited to, global positioning system (GPS), inertial navigation system (INS), and backed up by radio navigation to determine the aircraft's position, the FMS guides the aircraft along the flight plan. From the cockpit, the FMS is normally controlled through a Control Display Unit (CDU) which incorporates a small screen and keyboard or touch screen. The FMS transmits the flight plan for display on the EFIS, Navigation Display (ND) or Multifunction Display (MFD). The FADEC and FMS are separate system that in some cases may communicate current values of parameters.

Some known aircraft engines include a turbine including a hot section and a cold section. To improve fuel efficiency, thrust, and/or turbine life, at least some known engines attempt to control a distance or clearance between a tip of each turbine blade and a surrounding shroud to a minimum. However, a blade tip length, as measured from a rotor center, may increase in proportion to the square of an angular velocity of the rotor, and linearly with temperature. Both of such effects may be caused by increasing fuel flow during maneuvers such as climbs, certain acts in the descent/landing sequence, and/or evasive actions. Moreover, the blade tip length may increase more rapidly than the shroud expands during operation, especially during transient operations, such as those that require increased fuel flow. As such, during such operations, the blade tip may make contact with the shroud in a condition known as a rub.

At least some known aircraft engines use active clearance control to prevent rubs. Active clearance control, in at least some known embodiments, attempts to cause the shroud to expand linearly by bathing the shroud in hot air, based on similar physical properties that cause the blade tip length to expand linearly with an increase in temperature. However, a time constant that describes a rate of blade tip length growth is generally markedly different than a time constant that describes a rate of shroud expansion, such that the blade tip length generally increases more rapidly.

At least some known aircraft engines activate a clearance control in response to one or more engine operating parameters. Moreover, at least some known aircraft engines activate a clearance control based on an elapsed time relative to a transient engine condition, such as a throttle burst and/or a change in rotor speed. Further, at least some known aircraft engines deactivate a clearance control based on, for example, an aircraft altitude. In addition, other known active clearance controls are based on mathematical models based on data acquired from one or more aircraft engines. However, such controls may not adequately anticipate an increase in fuel flow in order to start shroud expansion prior to the increase in the blade tip length. For example, during flights in which a throttle change is required to climb from one altitude to another, aircraft engine response is conventionally increased based on a predetermined schedule, causing the rotor blades to grow (e.g., lengthen) more rapidly than the surrounding shroud surrounding them, due to mechanical acceleration of the rotor blades. Clearance control systems lag behind the relatively rapid expansion of the blades in an engine speed increase situation, and tolerances must therefore be increased to prevent rub.

BRIEF DESCRIPTION

In one aspect, a method for reducing a turbine clearance gap between a plurality of rotor blades of a turbine engine and a shroud of the turbine engine is provided. The method includes determining, with a flight operation controller, that an airplane is in a first flight condition. The method also includes adjusting the turbine clearance gap to a first clearance gap distance associated with the first flight condition, and determining, with the flight operation controller, a demand for a second flight condition. The method further includes adjusting an engine responsiveness to a first engine responsiveness level for a first predetermined change in a power parameter of the engine. The method also includes reducing the engine responsiveness from the first engine responsiveness level to a second engine responsiveness level for a second predetermined change in the power parameter of the engine. The method still further includes closing a clearance control valve associated with the shroud during the second predetermined change in the power parameter of the engine.

In another aspect, a clearance control system for reducing a turbine clearance gap between a plurality of blades of a turbine engine and a shroud of the turbine engine is provided. The clearance control system includes a flight operation controller. The flight operation controller is configured to determine that an airplane is in a first flight condition, and adjust the turbine clearance gap to a first clearance gap distance associated with the first flight condition. The flight operation controller is also configured to determine a demand for a second flight condition. The flight operation controller is further configured to adjust an engine responsiveness to a first engine responsiveness level for a first predetermined change in a power parameter of the engine, and reduce the engine responsiveness from the first engine responsiveness level to a second engine responsiveness level for a second predetermined change in the power parameter of the engine. The flight operation controller is further configured to close a clearance control valve associated with the shroud during the second predetermined change in the power parameter of the engine.

In yet another aspect, an airplane is provided. The airplane includes a plurality of turbine engines, and a clearance control system for reducing a turbine clearance gap between a plurality of blades and a shroud of at least one of the plurality of turbine engines. The clearance control system includes a flight operation controller. The flight operation controller is configured to determine that the airplane is in a first flight condition, and adjust the turbine clearance gap to a first clearance gap distance associated with the first flight condition. The flight operation controller is also configured to determine a demand for a second flight condition. The flight operation controller is further configured to adjust an engine responsiveness to a first engine responsiveness level for a first predetermined change in a power parameter of the at least one of the plurality of turbine engines, and reduce the engine responsiveness from the first engine responsiveness level to a second engine responsiveness level for a second predetermined change in the power parameter of the at least one of the plurality of turbine engines. The flight operation controller is further configured to close a clearance control valve associated with the shroud during the second predetermined change in the power parameter of the at least one of the plurality of turbine engines.

DETAILED DESCRIPTION

The following detailed description illustrates embodiments of the present disclosure by way of example and not by way of limitation. It is contemplated that the systems and methods described herein have general application to analytical and methodical embodiments of system communication in industrial, commercial, and residential applications.

As used herein, an element or step recited in the singular and preceded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

Figure 1:
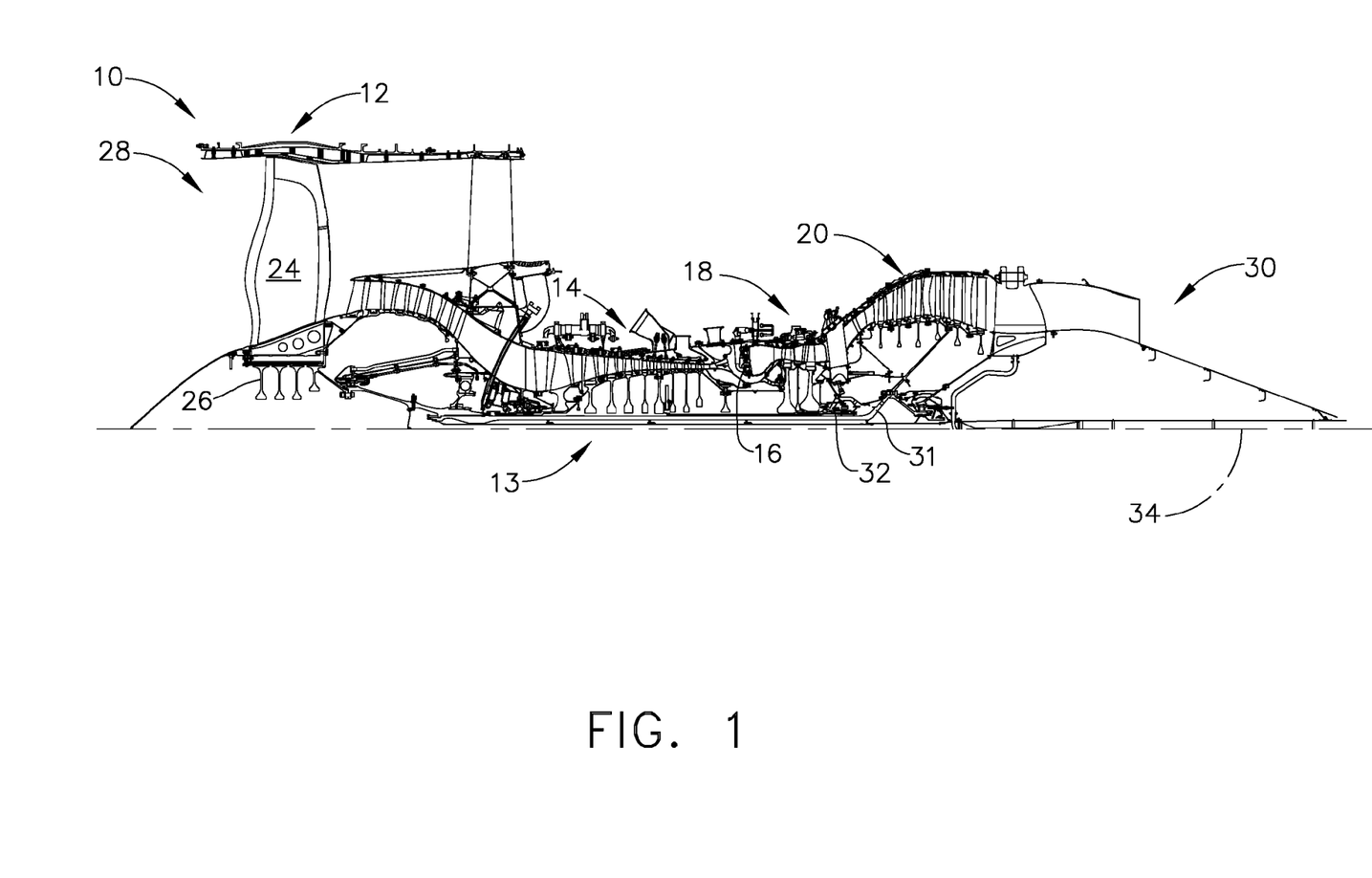
FIG. 1 is a schematic illustration of an exemplary gas turbine engine.

FIG. 1 is a schematic illustration of a gas turbine engine 10 that includes, in an exemplary embodiment, a fan assembly 12 and a core engine 13 including a high pressure compressor 14, a combustor 16, and a high pressure turbine 18. Engine 10 also includes a low pressure turbine 20. Fan assembly 12 includes an array of fan blades 24 extending radially outward from a rotor disk 26. Engine 10 has an intake side 28 and an exhaust side 30. Fan assembly 12 and low pressure turbine 20 are coupled by a low speed rotor shaft 31, and compressor 14 and high pressure turbine 18 are coupled by a high speed rotor shaft 32.

During operation, air flows axially through fan assembly 12, in a direction that is substantially parallel to a central axis 34 extending through engine 10, and compressed air is supplied to high pressure compressor 14. The highly compressed air is delivered to combustor 16. Combustion gas flow (not shown in FIG. 1) from combustor 16 drives turbines 18 and 20. Turbine 18 drives compressor 14 by way of high speed rotor shaft 32 and turbine 20 drives fan assembly 12 by way of low speed rotor shaft 31.

Figure 2:
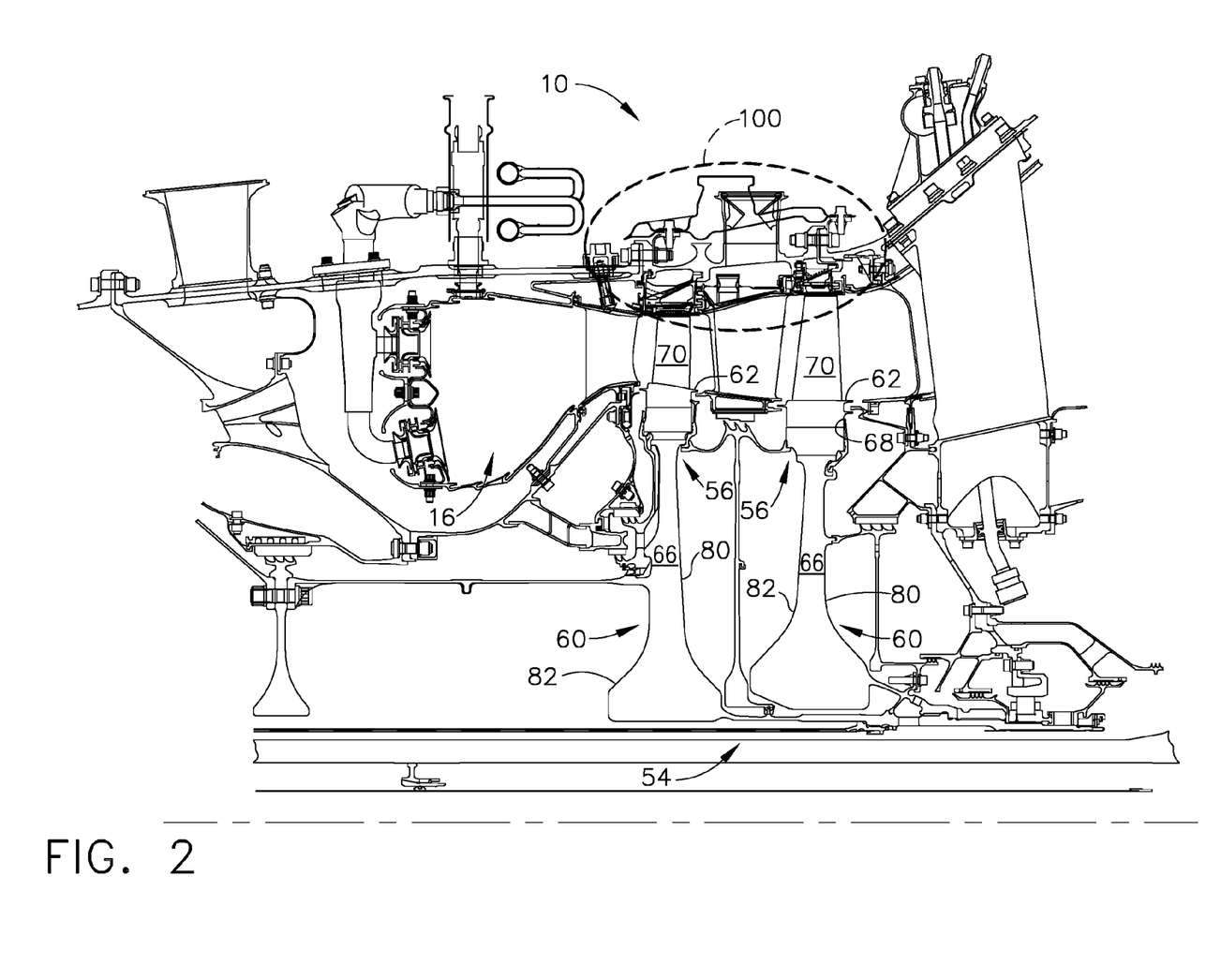
FIG. 2 is an enlarged cross-sectional schematic illustration of a portion of the gas turbine engine shown in FIG. 1 including a clearance control system.
Figure 3:
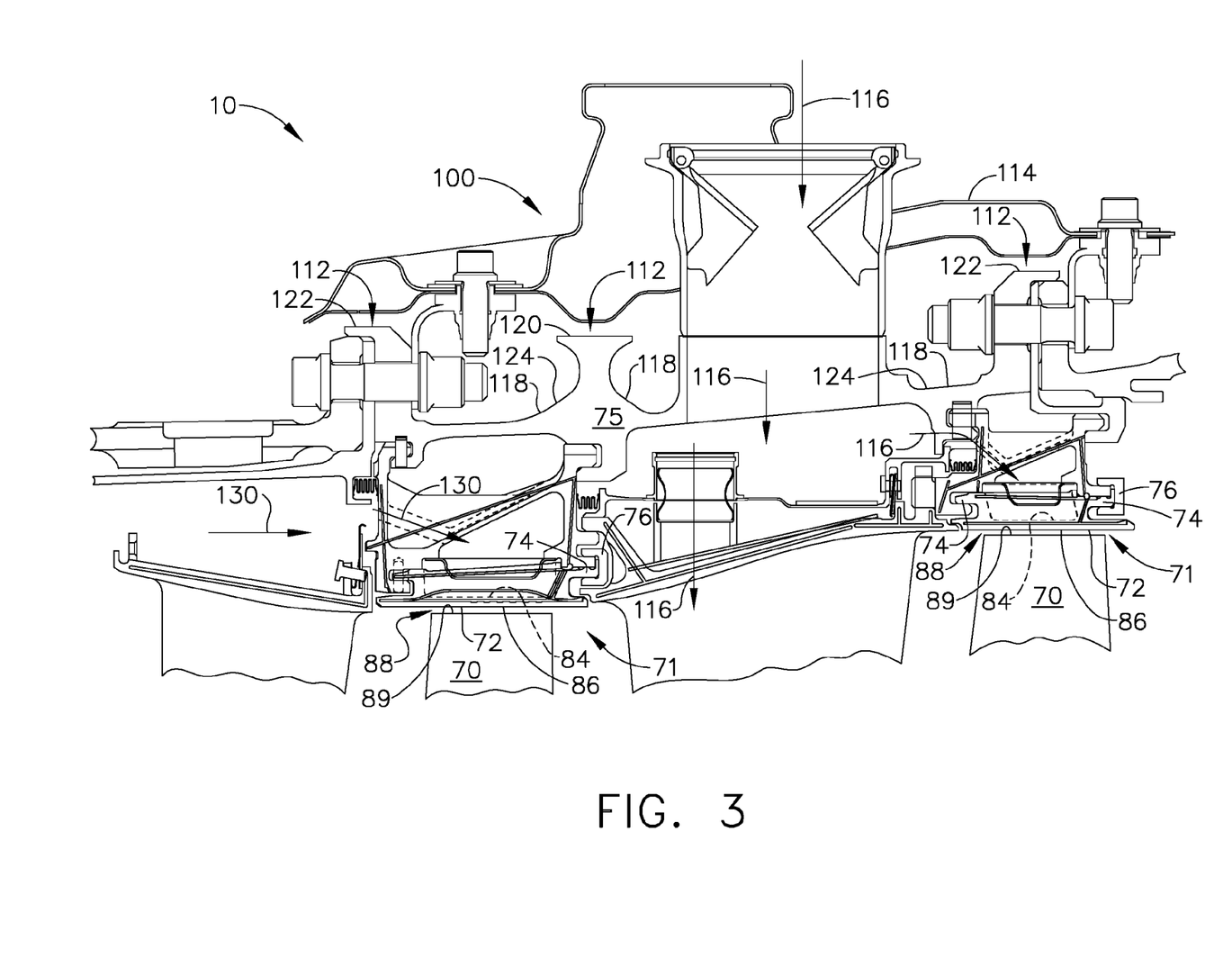
FIG. 3 is an enlarged cross-sectional schematic illustration of the clearance control system shown in FIG. 2.

FIG. 2 is an enlarged cross-sectional schematic illustration of a portion of gas turbine engine 10 including a clearance control system 100. FIG. 3 is an enlarged cross-sectional schematic illustration of clearance control system 100. In the exemplary embodiment, high pressure turbine 18 is coupled substantially coaxially with, and downstream from, compressor 14 (shown in FIG. 1) and combustor 16. Turbine 18 includes a rotor assembly 54 that includes at least one rotor 56 that is formed by one or more disks 60. In the exemplary embodiment, disk 60 includes an outer rim 62, and an integral web 66 extending generally radially therebetween and radially inward from a respective blade dovetail slot 68. Each disk 60 also includes a plurality of blades 70 extending radially outward from outer rim 62. Disk 60 includes an aft surface 80 and an upstream surface 82.

Circumscribing the row of high pressure blades 70, and in close clearance relationship therewith, is an annular shroud assembly 71, also referred to as a static casing assembly. In the exemplary embodiment, shroud assembly 71 is radially inward from a surrounding turbine casing 75 and includes a plurality of shroud members or arcuate sectors 72 coupled to shroud hangers 74 and to a C-clip 76. Adjacent shroud members 72 are coupled together to such that shroud members 72 circumscribe blades 70.

Each shroud member 72 includes a radially outer surface 84 and an opposite radially inner surface 86. A clearance gap 88 is defined between shroud inner surface 86 and tips 89 of rotor blades 70. More specifically, clearance gap 88 is defined as the distance between turbine blade tips 89 and shroud inner surface 86. Engine 10 may include a plurality of stages including a plurality of rotor blades 70 and clearance gaps 88 associated with each stage.

Clearance control system 100 facilitates controlling clearance gap 88 during engine operation. More specifically, in the exemplary embodiment, clearance control system 100 facilitates controlling gap 88 between rotor blade tips 89 and shroud inner surface 86. Clearance control system 100 is coupled in flow communication to a cooling air supply source via a manifold 114. Cooling air exits manifold 114 and impinges on surfaces 120 and 122 extending from casing 75. The cooling air supply source may be any cooling air supply source that enables clearance control system 100 to function as described herein, such as, but not limited to, fan air, an intermediate stage of compressor 14, and/or a discharge of compressor 14. In the exemplary embodiment, cooling air 116 is bled from an intermediate stage of compressor 14 for cooling stage 2 nozzles and surrounding shrouds.

In the exemplary embodiment, manifold 114 extends circumferentially about turbine casing 75 and enables cooling air 112 to impinge against surfaces 120 and 122 substantially uniformly. The thermal radial displacement of surfaces 120 and 122 facilitates limiting casing displacement, and thus facilitates control of clearance gap 88. Casing 75 extends substantially circumferentially and includes at least some portions of external surface 118, i.e., see for example, surfaces 120, 122, and/or 124, that are positioned in flow communication with cooling air discharged from manifold 114. In one embodiment, surfaces 120 and 122 extend over portions of clearance control system 100 components such as, but not limited to, turbine casing, rings, and/or flanges.

During engine operation, compressor discharge pressure air 130 is channeled from compressor 14 towards shroud assembly 71 and clearance gap 88. In addition, cooling air 116 is directed through turbine casing 75. As such, compressor discharge pressure air 130 and/or cooling air 116 facilitate cooling at least one stage 2 nozzle of turbine 18, and/or a stage 2 shroud assembly 71, and/or facilitate purging turbine middle seal cavities (not shown). The combination of cooling air 116, compressor discharge pressure air 130, and/or external cooling of casing 75 facilitates enhanced control of clearance gap 88 and facilitates increasing the heat transfer effectiveness of casing surfaces 120 and/or 122. As a result of the increased effective heat transfer of clearance control system 100, clearance gap 88 is facilitated to be more effectively maintained than is controllable using known clearance control systems. Moreover, the improved clearance gap control is achievable without increasing the amount of air 112, 116, and/or 130 supplied to clearance control system 100. As a result, turbine efficiency is facilitated to be increased while fuel burn is facilitated to be reduced.

It should be noted that, although FIGS. 2 and 3 describe a clearance control system that uses cool air to control a turbine clearance, any suitable clearance control system may be used in accordance with the embodiments described herein. For example, a clearance control system may use hot air to control turbine clearance. As such, as used to describe the embodiments disclosed herein, a clearance control system may be either a system that uses cool air or a system that uses hot air. Furthermore, it should be understood that although reference is made to high-pressure turbine 18 in the examples of FIGS. 2 and 3, clearance control system 100 as described herein may be used for clearance control of other components of engine 10, such as low-pressure turbine 20.

Moreover, as used herein, the term "minimum clearance" refers to a minimum distance associated with clearance gap 88 that may be set without probability of a rub. A minimum clearance is a function of several variables including, but not limited to only including, turbine major axis out-of-round tolerance, vibrational induced movements, fuel flow, core speed, and engine gas temperatures.

Figure 4:
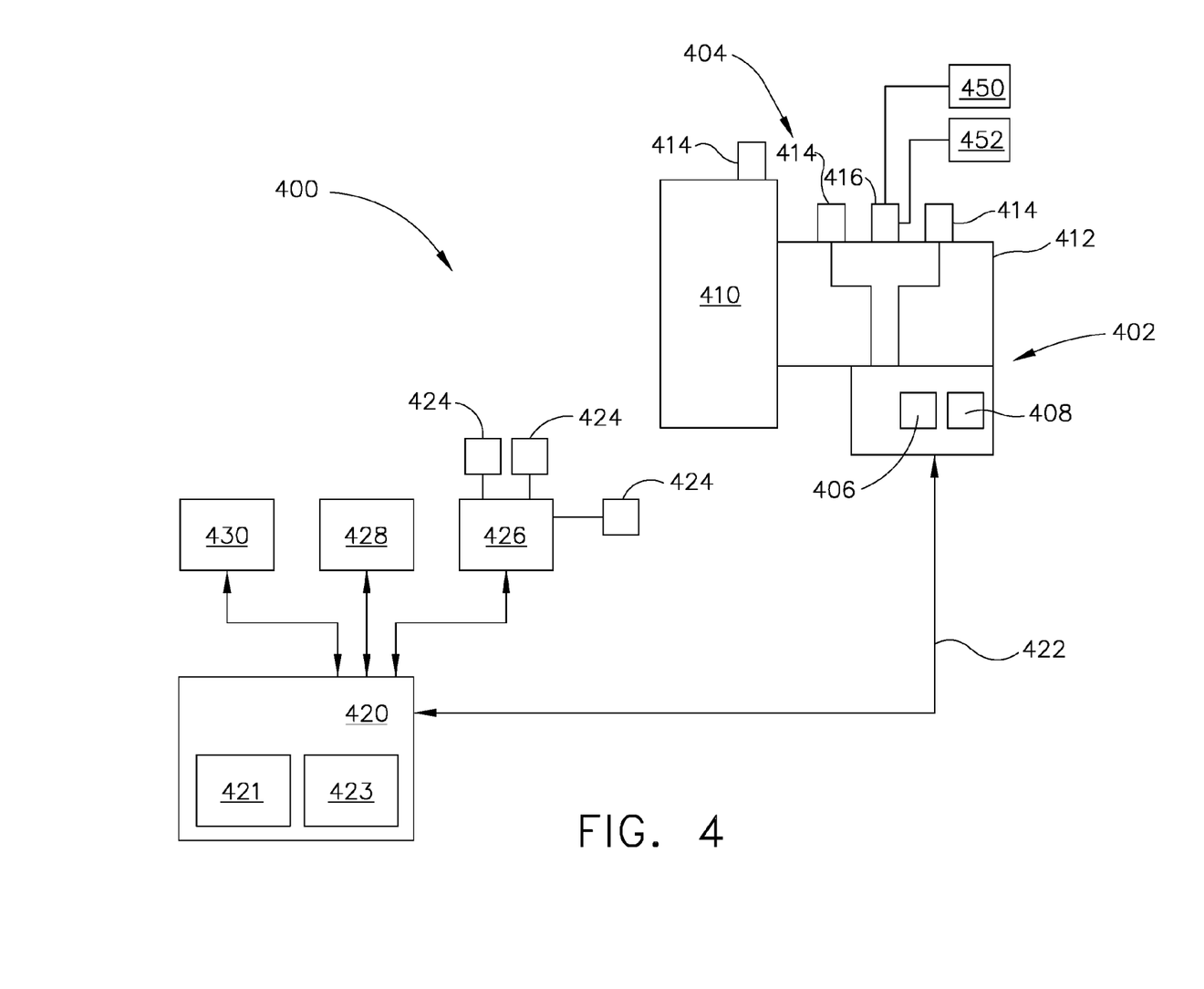
FIG. 4 is a schematic block diagram of an integrated engine control and flight control system in accordance with an exemplary embodiment of the present disclosure.

FIG. 4 is a schematic block diagram of an integrated engine control and flight operation system 400 in accordance with an exemplary embodiment of the present disclosure. In the exemplary embodiment, integrated system 400 includes an engine control system 402 such as, but not limited to, a FADEC, mounted proximate to an associated aircraft engine 404. Engine control system 402 includes a processor 406 and a memory 408 communicatively coupled to processor 406. Engine 404 includes a fan 410 and a core engine 412 in serial flow communication. In some embodiments, substantially all air flow through fan 410 goes through core engine 412. In various embodiments, engine 404 is a high bypass type engine and only a portion of the airflow entering fan 410 passes through core engine 412. Although described as a FADEC, in various embodiments, engine control system 402 may include other forms of engine controller capable of operating as described herein.

A plurality of process sensors 414 are positioned about engine 404 to sense process parameters associated with engine 404. Such process parameters include for example, engine speed, fuel flow, damper and guide vane positions, stator vane clearance, as well as various temperatures of components in engine 404. Sensors 414 are communicatively coupled to engine control system 402. In addition, one or more actuators 416 are positioned about engine 404 and are operably coupled to components of engine 404 to effect the operation of those components. Actuators 416 are also communicatively coupled to engine control system 402. In one embodiment, actuators 416 are in communication with one or more high-pressure turbine (HPT) active clearance control (ACC) valves 450 and one or more low-pressure turbine (LPT) ACC valves 452. HPTACC valves 450 are coupled in flow communication with high pressure turbine 18 (shown in FIG. 1) and are configured to control a heating and/or cooling flow channeled to high pressure turbine 18. LPTACC valves 452 are coupled in flow communication with low-pressure turbine 20 (also shown in FIG. 1) and are configured to control a heating and/or cooling flow channeled to low pressure turbine 20. Actuators 416 may receive commands to open or close one or more HPTACC valve(s) 450 and/or LPTACC valve(s) 452 to control the heating/cooling flow delivered to HPT 18 and/or LPT 20 as part of the engine response schedules, described further herein. Sensors 414 and actuators 416 are used by engine control system 402 to determine operating conditions of engine 404, including but not limited to, a performance of engine 404 relative to a baseline or new operating condition. Engine control system 402 may then operate actuators 416 to account for deterioration and/or damage to engine 404 between overhauls. Engine control system 402 may also use sensors 414 and actuators 416 to store the determined engine condition for future reference, further processing, and/or reporting.

System 400 also includes a flight control system 420 (e.g., flight management system or FMS) communicatively coupled to engine control system 402 through a communications channel 422. Flight control system 420 includes a processor 421 and a memory 423 communicatively coupled to processor 421. In the exemplary embodiment, communications channel 422 is a wired connection between engine control system 402 and flight control system 420. In various other embodiments, communications channel 422 may be a wireless communication medium. In the exemplary embodiment, flight control system 420 is located proximate a cockpit (not shown) of the aircraft and engine control system 402 is located proximate the engine to which it is associated. Flight control system 420 may be embodied in a single processor-based component or the functions of flight control system 420 may be carried out by a plurality of components configured to perform the functions described herein. Some of the components performing the functions of flight control system 420 may be located proximate the cockpit and others may be distributed inside the aircraft for convenience, safety, and/or optimal operational considerations. Although the flight control system is described herein as a flight management system (FMS), it is to be understood that the systems and methods described herein include communication between an engine controller and any aircraft-mounted avionics function.

Flight control system 420 is configured to interface with various other systems both onboard the aircraft and offboard the aircraft. For example, flight control system 420 may receive current aircraft status from a plurality of aircraft sensors 424 through a sensing system 426. Such sensors may include pitot tubes for determining airspeed, gyros, compasses, accelerometers, position sensors, altimeters, and various other sensors that may be able to detect a condition, status, or position of the aircraft. Flight control system 420 may also receive information from one or more onboard processing systems 428, which may be standalone systems or systems having functions distributed across several computer systems. Flight control system 420 and onboard processing systems 428 may communicate using a wired communications channel and/or network connection (e.g., Ethernet or an optical fiber), a wireless communication means, such as radio frequency (RF), e.g., FM radio and/or digital audio broadcasting, an Institute of Electrical and Electronics Engineers (IEEE®) 802.11 standard (e.g., 802.11(g) or 802.11(n)), the Worldwide Interoperability for Microwave Access (WIMAX®) standard, cellular phone technology (e.g., the Global Standard for Mobile communication (GSM)), a satellite communication link, and/or any other suitable communication means. As used herein, a wired communications channel includes channels that use fiber and other optical means for communications. Flight control system 420 may also receive information from one or more offboard processing systems 430, which may be standalone systems or systems having functions distributed across several computer systems and/or several sites. Offboard processing systems 430 and flight control system 420 are communicatively coupled using one or more wireless communications media including, but not limited to, radio frequency (RF), e.g., FM radio and/or digital audio broadcasting, an Institute of Electrical and Electronics Engineers (IEEE®) 802.11 standard (e.g., 802.11(g) or 802.11(n)), the Worldwide Interoperability for Microwave Access (WI-MAX®) standard, cellular phone technology (e.g., the Global Standard for Mobile communication (GSM)), a satellite communication link, and/or any other suitable communication means.

As in at least some known aircraft operating procedures, a step climb maneuver occurs when the pilot of an aircraft elects to increase the altitude at which the aircraft is traveling. Altitude steps conventionally occur in 2,000 feet increments, as dictated by current FAA regulations. This means, for example, that the pilot of an aircraft flying at 33,000 feet may elect to undertake a step climb maneuver to cause the aircraft to climb 2,000 feet to an altitude of 35,000 feet. In order to effectuate the step climb maneuver, the pilot modifies the controls of an auto-pilot/auto-throttle system of the flight control system 420 to request that the aircraft ascend to the desired cruising altitude. The flight control system 420 then uses predetermined algorithms to increase engine power in order to cause the aircraft to climb. Because a request for increased engine power conventionally necessitates that the engine 10 spin faster, thereby increasing engine thrust, turbine blades 70 (e.g., rotor blades) grow due to mechanical forces and associated thermal changes. This turbine blade 70 growth causes clearances within, for example, the high-pressure turbine 18 to be reduced. If the growth exceeds design tolerances, the turbine blades 70 will rub against the casing 75 of the engine 10, potentially causing damage to engine 10 components or reducing the engine's efficiency.

With the clearance control system 100, thermal growth of the engine 10 casing can be matched to the thermal and mechanical growth of the turbine blades 70 if adequate time is given for the clearance control system to operate. For example, a step climb from approximately 33,000 to 35,000 feet may take the aircraft more than two minutes to accomplish. Known flight control system step climb algorithms, however, command engine 10 response to a request for increased thrust within, for example, 5 seconds, causing the rate of growth of turbine blades 70 to exceed the rate of growth of the engine 10 casing. Because the turbine blades 70 grow faster than the surrounding engine casing 75, it is necessary for engine 10 designers to factor in additional clearance to prevent a rub condition in these situations. In the above example, the additional clearance is referred to herein as step-climb headroom. However, by increasing the clearance between the end of the turbine blades 70 and the engine casing 75, more air is able to escape past the turbine blade, instead of traveling through the blades, resulting in decreased engine 10 performance and increased fuel burn. Therefore, it is desirable to develop flight control system 420 or engine control system 402 algorithms which take into account the rate of growth of the engine casing when determining the rate at which to increase engine speed, thereby reducing the discrepancy in turbine blade and casing growth, allowing for tighter tolerances in, for example, the high pressure turbine 18 and/or the low pressure turbine 20. Tighter tolerances, for example, result in more efficient fuel burn.

Figure 5:
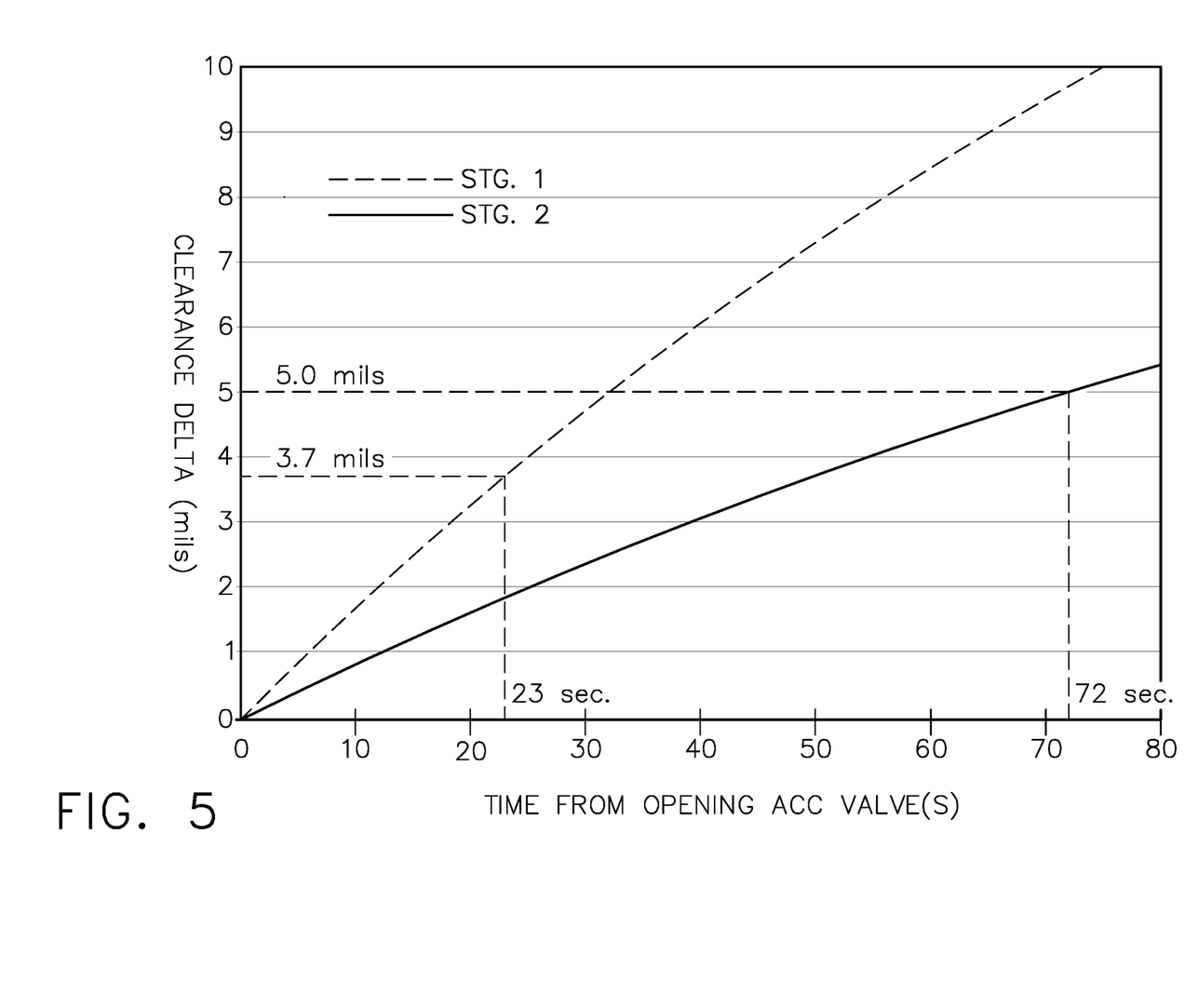
FIG. 5 is a chart illustrating a first example embodiment of case growth compared to rotor blade growth.

FIG. 5 illustrates the HPT blade tip clearance delta after activating the clearance control system 100 (shown in FIGS. 2-4) for both a first stage and a second stage of engine 10 (shown in FIG. 1). There are two turbine stages (i.e., two sets of turbine blades 70 or rotors separated by a set of static stator vanes). Clearance control system 100 provides different amounts of cooling and/or warming air to the casing 75 at each turbine stage.

In the exemplary embodiment, the speed increase of the turbine blades 70 for the first stage may be rate-limited, i.e. an engine responsiveness level may be adjusted, using a first ramp time defined by the time required for the clearance control system 100 to adjust the size of casing 75 to accommodate the growth of rotor blades 70 in the first stage that takes place due to rotor speed variations. In one implementation the first ramp time is nominally 23 seconds though more or less time may be used based on the specific clearance control system 100 and clearance gap 88 associated with the first stage. In such an embodiment, casing 75 growth is matched with the turbine blade 70 (e.g., rotor) growth that takes place due to rotor speed and temperature changes (e.g., mechanical forces and temperature increases) for the first stage, enabling the removal of up to a nominal 3.7 mils of headroom in the high-pressure turbine's first stage clearance gap 88 without causing a rub. The removal of headroom from clearance gap 88 causes a tighter clearance, thereby improving fuel burn.

In the exemplary embodiment, the speed increase of the turbine blades 70 for the second stage needs to be rate-limited using a second ramp time, to close down the exemplary 5.0 mils of the clearance gap 88 associated with the second stage of engine 10. The second ramp time is comparatively longer, nominally 72 seconds in one implementation, than the first ramp time at steady-state cruise (SSCR) conditions. These numbers are exemplary values, and will change depending on the specific clearance control system 100 and the clearance gap 88 associated with the second stage. Coordinating case 75 growth with rotor growth for the second stage enables removal of up to a nominal 5.0 mils of headroom in the high-pressure turbine's second stage clearance gap 88, thereby improving fuel burn.

In some embodiments, reducing the turbine clearance gap 88 associated with the first stage benefits fuel burn much more than reducing the turbine clearance gap 88 associated with the second stage. As reducing the engine responsiveness level of engine 10 helps reduce clearance gaps 88, but may have a negative effect on aircraft performance, in the exemplary embodiment, engine 10 has its engine responsiveness level adjusted to a second engine responsiveness level associated with the relatively shorter first ramp time. In other embodiments, engine 10 has its engine responsiveness level adjusted to a second engine responsiveness level associated with the relatively longer second ramp time, which facilitates reducing the clearance gap 88 associated with the second stage more than rate limiting engine 10 to the first ramp time, thereby increasing fuel burn efficiency.

Figure 6:
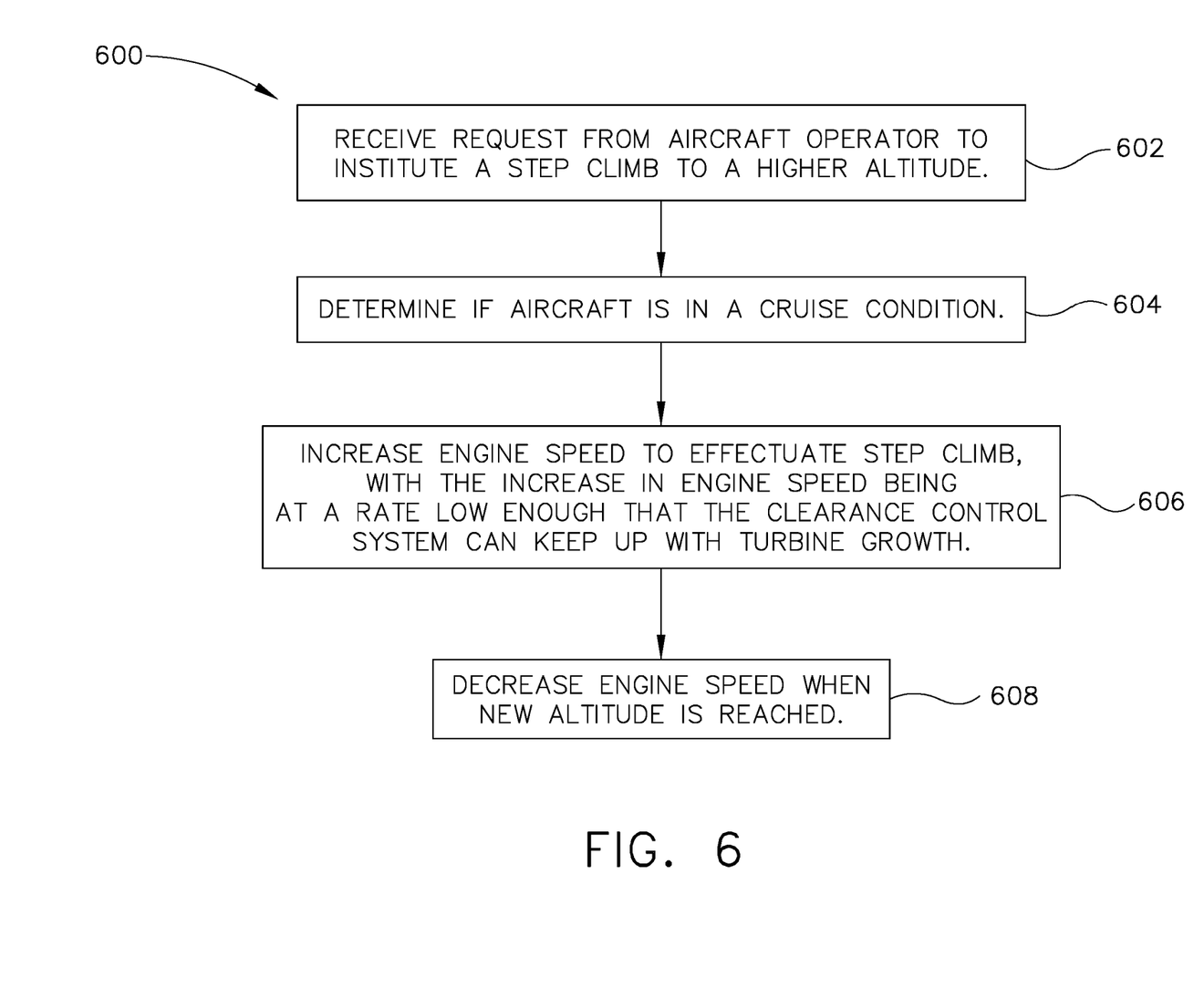
FIG. 6 is a flowchart illustrating a first exemplary method of controlling a turbine clearance in an aircraft engine.

FIG. 6 is a flowchart 600 illustrating a first exemplary method of controlling a turbine clearance in an aircraft engine 10, such as engine 10 (shown in FIG. 1). More specifically, flowchart 600 illustrates a method of controlling a turbine clearance using active clearance control system 100 (shown in FIGS. 2-4) by reducing the rate at which engine speed is increased during a step climb event.

In the exemplary embodiment, a request is received 602 from the aircraft operator to institute a step climb to a higher altitude. The request may be received by monitoring the position of the throttle and observing a particular change in the angle of the throttle, signifying a step climb event. The request may also be received by the auto-pilot/auto-throttle control system of the flight control system 420 whereby the pilot requests an increase from one particular altitude to a second particular altitude. In response to that request, the flight control system 420 sends a signal to the engine control system 402 requesting increased engine power.

According to the exemplary embodiment, engine control system 402 may receive 602 a request for increased engine power and make a determination 604 as to whether the aircraft is presently operating in a steady-state cruise condition. For example, to determine whether the aircraft is in a cruise condition, engine control system 402 may examine the following parameters: that the cruising altitude of the aircraft is greater than 29,000 feet; that the cruising altitude has not changed significantly over a predetermined period of time; that speed of the aircraft is relatively constant; and that the throttle position of the aircraft is not changing. In response to a determination that a cruise condition exists, engine control system 402 then interprets a request for increased engine power as a request for a step climb event. engine control system 402 increases 606 engine speed at a reduced rate to limit thermal and mechanical expansion of the turbine blades 70 in order that the active clearance control system 100 bathes casing 75 components in hot or cool air as necessary to cause casing 75 expansion to track expansion of the turbine blades 70, facilitating reducing the clearance between the turbine blades 70 and the engine casing 75, improving fuel economy. In the exemplary embodiment, fuel economy can be increased by approximately 0.02 to 0.03 percent during the step climb event. A benefit of approximately 0.31% SFC at cruise can be realized, according to some embodiments. When the desired altitude is reached, engine control system 402 responds 608 to commands to decrease engine speed so that the aircraft is held at the desired altitude.

If, during the time the rate of engine speed is limited, any of the following events occur, engine control system 402 will give a normal engine response to a request for increased power: the altitude of the aircraft is below a threshold altitude (e.g., 29,000 feet); the auto-throttle is disengaged; variations in throttle movement are relatively large and greater than a predetermined amount, such as if the aircraft were being flown into bad weather; the altitude of the aircraft changes by greater than a threshold amount; the rotor speeds drop below a predefined value; and throttle resolver angle ("TRA") is above climb setting or below cruise setting.

In the event that maximum engine response is necessary for an emergency maneuver, engine control system 402 will respond to a change in throttle position greater than a threshold with normal engine response. For example, that threshold may be greater than a 20 degree change in the position of the throttle.

It is recognized that all of the functions being performed by engine control system 402 can also be performed by the flight control system 420 and transmitted to engine control system 402 to effectuate an engine response.

According to another embodiment, a cruise condition can be determined by the flight control system 420 or engine control system 402 reading an auto-pilot bit that is set, for example, to "1" when the auto-pilot/auto-throttle is engaged. The flight control system 420 or engine control system 402 will respond to this bit by slowing the rate at which the engine accelerates, thereby slowing turbine growth so that the clearance control system 100 can operate to maintain a tight clearance gap 88 between the turbine blades 70 and the casing 75.

According to another embodiment, a cruise condition can be determined by the engagement of a "supercruise" switch, to indicate that the aircraft is in a fuel-saving "supercruise" mode, in which the rate at which the engine 10 accelerates for a step climb maneuver is reduced in order to save fuel by maintaining a tight clearance gap 88 in the high pressure turbine.

According to yet another embodiment, a cruise condition can be determined using fuzzy logic which records aircraft routes and usage over time. The fuzzy logic can determine if the airplane is likely in a cruise condition based on its location along its route, and respond to a request for a step climb maneuver in a fuel-efficient manner, by slowing the rate of engine 10 acceleration to maintain a tight clearance gap 88 within the turbine sections of the engine 10.

According to an even further embodiment, the flight management system can determine a cruise condition based upon a number of known/measured factors, such as the weather, other air traffic and the flight plan.

With the knowledge that the aircraft is in a cruise condition, turbines clearance may be closed by a predetermined amount using the active clearance control system. Reducing turbine clearance increases efficiency in engine operation and reduces fuel burn during the cruise phase of the flight. To account for these reduced, tighter clearances, engine response to throttle change is modified to provide normal engine response to small throttle changes and slower engine response to larger throttle changes.

Figure 7:
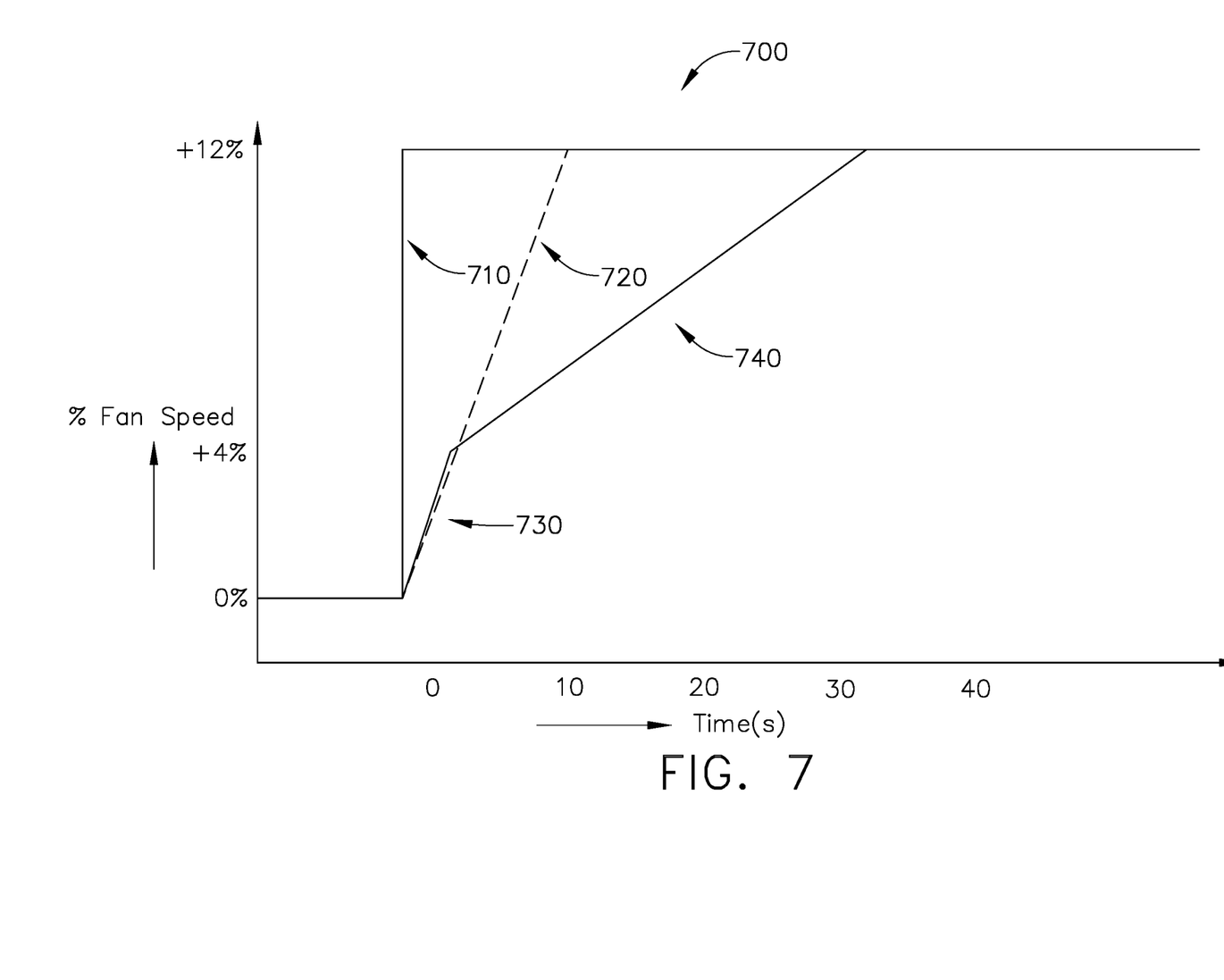
FIG. 7 is a chart illustrating a second example embodiment of case growth compared to rotor blade growth.

FIG. 7 is a chart 700 illustrating a two-step engine response schedule as a function of fan speed. In the illustrated embodiment, the dashed line 720 represents a simplified example of engine response to a commanded change 710 in the absence of the proposed system. Without the proposed two-step engine response schedule, after a request for an increase in fan speed from a steady-state cruise speed (represented as "0%" on the y-axis of chart 700) to a climb speed (e.g., about a 12% increase), the engine 10 responds quickly and increases rotational speed of low speed rotor shaft 31 ("N1") to the climb speed.

The solid line represents a two-step response schedule implemented using clearance control system 100 in accordance with the present disclosure. In the illustrated embodiment, clearance control system 100 implements different engine responsiveness levels as a function of N1 rate of increase from a steady-state cruise fan speed. In particular, clearance control system 100 implements a first, "normal" level of engine responsiveness 730 ("fast response" 730) for small changes in fan speed, as represented by the greater slope during the period of fast response 730. Clearance control system 100 implements a second, reduced level of engine responsiveness 740 ("slower response" 740) for larger changes in fan speed, as represented by the reduced slope during the period of slower response 740. In the illustrated embodiment, clearance control system 100 implements the fast response 730 for changes in fan speed between 0% and about 4%, and implements the slower response 740 for changes in fan speed above 4%. Put another way, clearance control system 100 implements the fast response 730 for changes in fan speed over a first change in power level or small increases in throttle, and implements the slower response 740 for changes in fan speed over a second change in power level or larger increases in throttle.

The fast response 730 defines a rate of increase limit on N1. In the illustrated embodiment, the fast response 730 limit on the rate of increase of N1 is approximately 1.5%/sec. Accordingly, engine 10 responds to requests for relatively small increases in throttle with fast response 730 for a period up to about 2-3 sec. For rates of increase of N1 beyond 4%, the slower response 740 defines a rate of increase limit for N1 of approximately 0.25%/sec, for example, up to a fan speed increase of 12%. In other words, once N1 has increased 4% from its steady-state cruise speed, clearance control system 100 implements slower response 740 (slows engine responsiveness) to increase N1 to the requested speed. Alternatively, for N1 rate increases that remain below 4%, clearance control system 100 only implements fast response 730. In some embodiments, during at least one of the fast response 730 period and the slower response 740 period, one or more ACC valves 450, 452 are closed to limit an amount of cooling or heating flow delivered to respective ones of high pressure turbine 18 and low pressure turbine 20. In one particular embodiment, HPTACC valve 450, and in some embodiments LPTACC valve 452, is closed during the fast response 730 period. Closing one or more ACC valves 450, 452 and reducing cooling air delivered to turbine(s) 18, 20 may facilitate increasing a distance of a clearance gap of a turbine casing (e.g., casing 75) therein to more suitably track the increasing length of turbine blades (e.g., turbine blades 70).

This two-step response schedule facilitates maintaining fast engine response for relatively small changes in throttle during routine maneuvers, for example, for maintaining altitude and/or Mach number in response to environmental changes (e.g., wind gusts). Moreover, the two-step response schedule of reduced engine responsiveness facilitates reducing clearance gap 88 as well as clearances between turbine blades (not shown) of low pressure turbine 20 and a casing therearound (not shown).

It should be understood that although example values have been expressed to describe one embodiment of a two-step response schedule, other values for rate limits and fan speed percentages may be employed in alternative two-step response schedules without departing from the scope of the disclosure. Moreover, it should be understood that a suitable two-step response schedule may be implemented with low-speed rotor shaft 31, high-speed rotor shaft 32, turbine blades 70 of high pressure turbine 18, turbine blades (not shown) of low pressure turbine 20, etc. In addition, it should be understood that a two-step response schedule may be implemented in association with an alternative power parameter of the engine than fan speed, such as engine pressure ratio or fuel flow.

Figure 8:
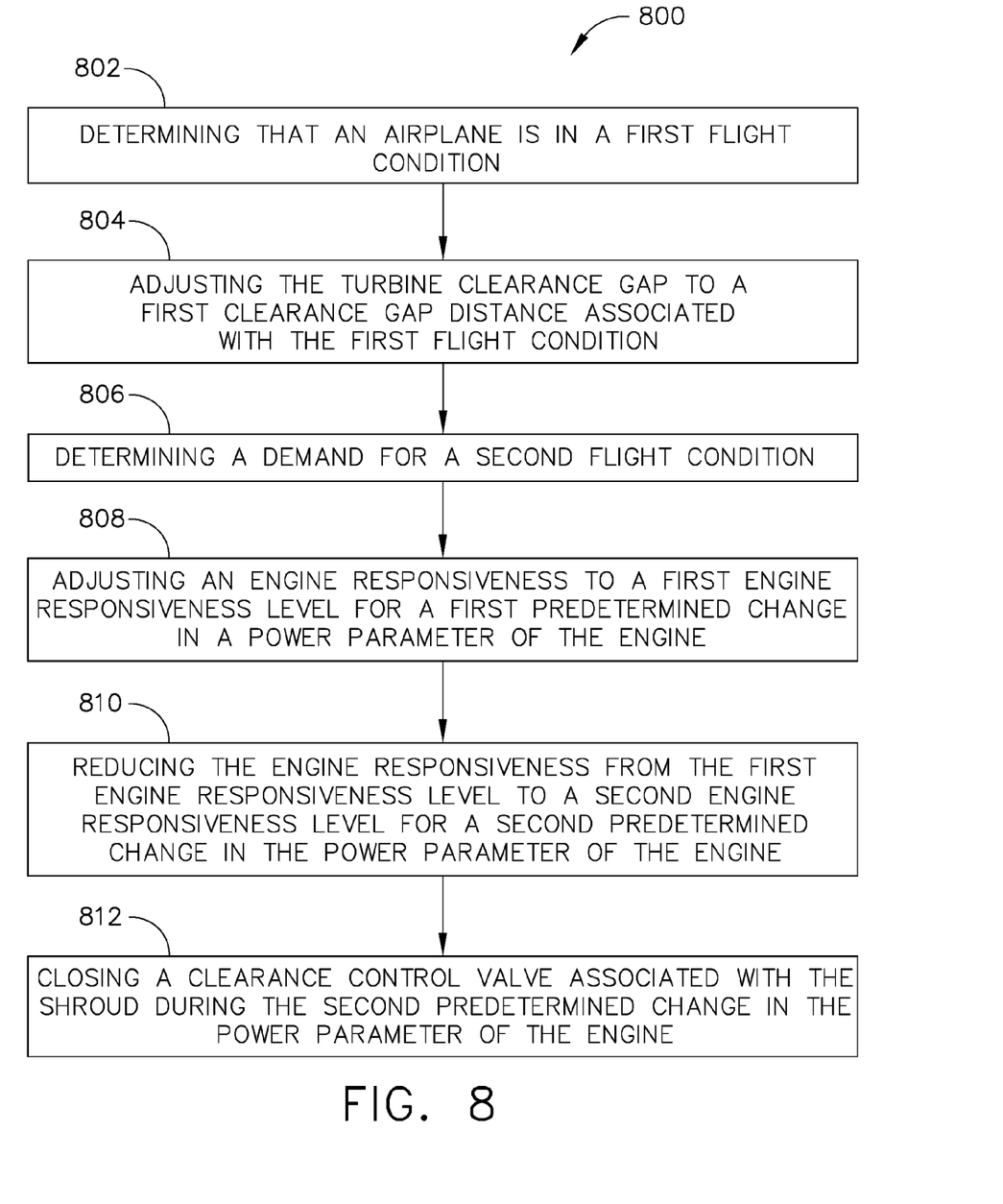
FIG. 8 is a flowchart illustrating a second exemplary method of controlling a turbine clearance in an aircraft engine.

FIG. 8 is a flowchart illustrating a second exemplary method 800 of controlling a turbine clearance gap in an aircraft engine. In some embodiments, one or more steps of method 800 are performed using a flight operation controller (e.g., engine control system 402). Method 800 includes determining 802 that an airplane is in a first flight condition (e.g., steady-state cruise). Method 800 also includes adjusting 804 the turbine clearance gap (e.g., clearance gap 88) to a first clearance gap distance associated with the first flight condition. For example, clearance gap 88 is adjusted 804 to a distance suitable for cruise, to improve engine efficiency. Method 800 also includes determining 806 a demand for a second flight condition (e.g., a request for a climb). Method 800 further includes adjusting 808 an engine responsiveness to a first engine responsiveness level (e.g., fast response 730) for a first predetermined change in a power parameter of the engine, and reducing 810 the engine responsiveness from the first engine responsiveness level to a second engine responsiveness level (e.g., slower response 740) for a second predetermined change in the power parameter of the engine. Method 800 also includes closing 812 a clearance control valve associated with the shroud during the second predetermined change in the power parameter of the engine.

The systems, methods, and apparatus described herein have at least a technical effect of more efficient operation of an aircraft by reducing the turbine clearance gap 88 by a preselected amount when the aircraft is determined to have entered a stable flight phase and is expected to remain in the stable flight phase for a preselected time period. Reducing the turbine clearance gap 88 facilitates improving fuel efficiency, thrust, and turbine life, each of which facilitates saving money on fuel and/or service.

Exemplary embodiments of systems, methods, and apparatus for controlling a turbine clearance gap 88 in an aircraft engine 10 are described above in detail. The systems, methods, and apparatus are not limited to the specific embodiments described herein but, rather, steps of the methods and/or components of the system and/or apparatus may be utilized independently and separately from other steps and/or components described herein. Further, the described steps and/or components may also be defined in, or used in combination with, other systems, methods, and/or apparatus, and are not limited to practice with only the systems, methods, and apparatus as described herein.

This written description uses examples to disclose embodiments of the present disclosure, including the best mode, and also to enable any person skilled in the art to practice the systems and methods described herein, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for reducing a turbine clearance gap between a plurality of rotor blades of a turbine engine and a shroud of the turbine engine, said method comprising:
    determining, with a flight operation controller, that an airplane is in a first flight condition;
    adjusting the turbine clearance gap to a first clearance gap distance associated with the first flight condition;
    determining, with the flight operation controller, a demand for a second flight condition;
    adjusting an engine responsiveness to a first engine responsiveness level for a first predetermined change in a power parameter of the turbine engine;
    wherein the power parameter includes fan speed, and wherein adjusting an engine responsiveness to a first engine responsiveness level for a first predetermined change in a power parameter of the engine comprises adjusting the engine responsiveness to the first engine responsiveness level for a first predetermined change in fan speed over a first predetermined change in power level;
    reducing the engine responsiveness from the first engine responsiveness level to a second engine responsiveness level for a second predetermined change in the power parameter of the turbine engine; and
    closing a clearance control valve associated with the shroud during the second predetermined change in the power parameter of the turbine engine.

2. The method in accordance with claim 1, reducing the engine responsiveness from the first engine responsiveness level to a second engine responsiveness level for a second predetermined change in the power parameter of the engine comprises reducing the engine responsiveness to the second engine responsiveness level for a second predetermined change in fan speed over a second predetermined change in power level greater than the first predetermined change in power level.

3. The method in accordance with claim 1, wherein closing a clearance control valve associated with the shroud during the second predetermined change in the power parameter of the engine comprises closing one or more clearance control valves in flow communication with the shroud.

4. The method in accordance with claim 1, wherein determining that an airplane is in a first flight condition includes determining that the airplane is in a steady-state cruise condition.

5. The method in accordance with claim 1, wherein reducing the engine responsiveness from the first engine responsiveness level to a second engine responsiveness level for a second predetermined change in the power parameter of the engine comprises limiting engine acceleration in response to a throttle increase.

6. A clearance control system for reducing a turbine clearance gap between a plurality of blades of a turbine engine and a shroud of the turbine engine, said clearance control system comprising a flight operation controller configured to:
    determine that an airplane is in a first flight condition;
    adjust the turbine clearance gap to a first clearance gap distance associated with the first flight condition;
    determine a demand for a second flight condition;
    adjust an engine responsiveness to a first engine responsiveness level for a first predetermined change in a power parameter of the turbine engine;
    wherein the power parameter includes fan speed, and wherein the flight operation controller is further configured to adjust the engine responsiveness to the first engine responsiveness level for a first predetermined change in fan speed over a first predetermined change in power level
    reduce the engine responsiveness from the first engine responsiveness level to a second engine responsiveness level for a second predetermined change in the power parameter of the turbine engine; and
    close a clearance control valve associated with the shroud during the second predetermined change in the power parameter of the turbine engine.

7. The clearance control system in accordance with claim 6, wherein the flight operation controller is further configured to reduce the engine responsiveness to the second engine responsiveness level for a second predetermined change in fan speed over a second predetermined change in power level greater than the first predetermined change in power level.

8. The clearance control system in accordance with claim 6, wherein the flight operation controller is further configured to close one or more clearance control valves in flow communication with the shroud.

9. The clearance control system in accordance with claim 6, wherein the first flight condition is a steady-state cruise condition.

10. The clearance control system in accordance with claim 6, wherein the second engine responsiveness level limits engine acceleration in response to a throttle increase.

11. An airplane comprising:
    a plurality of turbine engines; and
    a clearance control system for reducing a turbine clearance gap between a plurality of blades and a shroud of at least one of the plurality of turbine engines, the clearance control system comprising a flight operation controller configured to:
    determine that the airplane is in a first flight condition;
    adjust the turbine clearance gap to a first clearance gap distance associated with the first flight condition;
    determine a demand for a second flight condition;
    adjust an engine responsiveness to a first engine responsiveness level for a first predetermined change in a power parameter of the at least one of the plurality of turbine engines;
    wherein the power parameter includes fan speed, and wherein the flight operation controller is further configured to adjust the engine responsiveness to the first engine responsiveness level for a first predetermined change in fan speed over a first predetermined change in power level;
    reduce the engine responsiveness from the first engine responsiveness level to a second engine responsiveness level for a second predetermined change in the power parameter of the at least one of the plurality of turbine engines; and
    close a clearance control valve associated with the shroud during the second predetermined change in the power parameter of the at least one of the plurality of turbine engines.

12. The airplane in accordance with claim 11, wherein the flight operation controller is further configured to reduce the engine responsiveness to the second engine responsiveness level for a second predetermined change in fan speed over a second predetermined change in power level greater than the first predetermined change in power level.

13. The airplane in accordance with claim 11, wherein the flight operation controller is further configured to close one or more clearance control valves in flow communication with the shroud.

14. The airplane in accordance with claim 11, wherein the first flight condition is a steady-state cruise condition.

\* \* \* \* \*